United States Patent [19]

DuRocher et al.

[11] Patent Number: 5,610,378
[45] Date of Patent: Mar. 11, 1997

[54] STEERING COLUMN STALK SWITCH APPARATUS

[75] Inventors: Daniel J. DuRocher, Leonard; Ellsworth S. Miller, Rochester Hills, both of Mich.

[73] Assignee: ITT Corporation, New York, N.Y.

[21] Appl. No.: 533,639

[22] Filed: Sep. 25, 1995

Related U.S. Application Data

[63] Continuation of Ser. No. 97,268, Jul. 23, 1993, Pat. No. 5,453,588, which is a continuation of Ser. No. 972,597, Nov. 6, 1992, abandoned.

[51] Int. Cl.$^6$ ...................................................... H01H 3/16
[52] U.S. Cl. ..................................... 200/61.54; 200/61.27
[58] Field of Search ............................... 200/4, 6 R, 6 A, 200/17 R, 18, 61.27, 61.54

[56] References Cited

U.S. PATENT DOCUMENTS 5,003,132  3/1991  Lagier ........................................... 200/4
5,272,290  12/1993  Suzuki et al. ................................ 200/4
5,430,265  7/1995  Beattie et al. ........................ 200/61.54

*Primary Examiner*—Michael L. Gellner
*Assistant Examiner*—Michael A. Friedhofer
*Attorney, Agent, or Firm*—Thomas N. Twomey; J. Gordon Lewis

[57] ABSTRACT

A steering column mounted stalk switch apparatus includes an elongated shaft having a hub fixedly mounted at one end. The hub fixedly engages one end of a hollow knob housing. An aperture is formed in the opposite end of the housing and movably receives a button therein having at least one electrical contact mounted thereon. A carrier is slidably mounted in the housing for movement between a plurality of discrete positions and includes a projection extending externally through a side wall of the housing. Electrical contacts are mounted on the carrier and engage conductive tracings on the circuit board as the carrier is moved between the discrete positions.

8 Claims, 4 Drawing Sheets

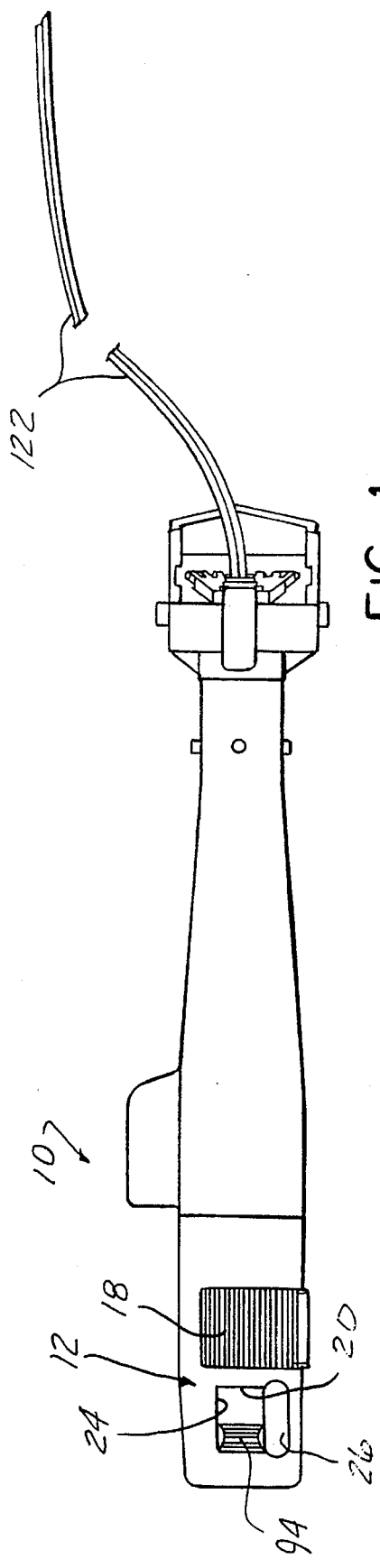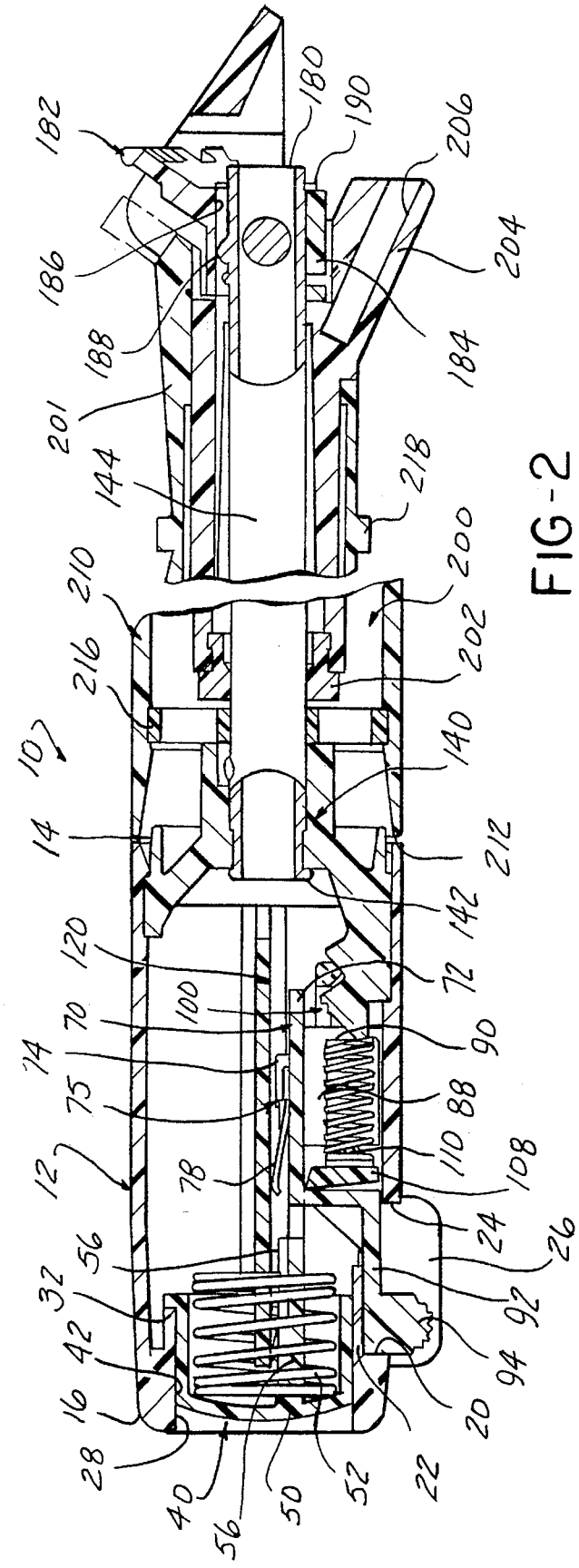

1

STEERING COLUMN STALK SWITCH APPARATUS

CROSS REFERENCE TO CO-PENDING APPLICATIONS

This application is a continuation of application Ser. No. 08/097,268, filed on Jul. 23, 1993 issued with U.S. Pat. No 5,453,588, which is a continuation of application Ser. No. 07/972,597, filed Nov. 6, 1992 and now abandoned, both entitled "STEERING COLUMN STALK SWITCH APPARATUS" and both by inventors Daniel J. DuRocher and Ellsworth S. Miller.

BACKGROUND OF THE INVENTION

1. Field of the Invention

The present invention relates, in general, to motor vehicles and, more specifically, to steering column mounted switches controlling vehicle operating circuits and devices.

2. State of the Art

The evolution of steering column switches in motor vehicles has been toward greater integration of functions in a single switch. Previously a plurality of individual switches, each controlling a single function, i.e., turn signals, windshield wipers, etc., were mounted on the vehicle dashboard or steering column. Current steering column switches are designed to control a variety of functions or vehicle operating circuits, for example, turn signals/hazard lights, high beam and low beam headlights with optional flash-to-pass, parking lights, and windshield wiper and wash functions, including multi-speed wipers with or without delay.

Typically, a steering column switch includes a single lever or stalk pivotally mounted on one side of a housing attached to the steering column in an easily accessible position for the driver of the vehicle. The lever is gimballed at one end in the housing so as to move in one of two mutually separate planes. Further, the lever may be provided with a rotatable end cap as well as a slidable member movable along the longitudinal axis of the lever. Actuators are mounted in the housing and, in response to movement of the lever in one direction, i.e., such as in one of the two mutually separate planes, or rotation of the end cap, move a switching member carrying contacts between various switching positions to effect the switching of electrical connections for a particular vehicle operating circuit.

In a typical application, pivotal movement of the lever in a substantially vertical plane about its gimballed connection to the housing controls the vehicle turn signals, and pivotal movement of the lever in a substantially horizontal plane controls the switching of the vehicle headlights between low beam, high beam and, optionally, flash-to-pass. Rotation of the end cap is used to control the operation of the vehicle windshield wiper system between on and off states and, optionally, a plurality of intermittent distinct speeds.

In vehicles employing an automatic cruise control, a slide switch or member is mounted in the end cap and is selectively movable between various positions including off, on, and a momentary resume set speed position. A spring-biased button is movably mounted in the end of the end cap and is employed to set a desired speed for the cruise control device. Movement of the slide member and/or the button between various positions cause electrical contacts mounted within the lever to close various circuits of the cruise control device depending upon the specific position of the slide member and the set speed button.

It is imperative in vehicles employing a cruise control device that the cruise control be designed to insure that the momentary resume set speed position is completely momentary such that a sticking of the switch member in the resume position is prevented. Furthermore, the steering column stalk switch must be easily and smoothly operable and, at the same time, must present a positive, user friendly tactile feel. To achieve these goals, the stalk switch must be designed with no looseness or play between the various members and must insure that the slide member positively engages each of the various detent positions during operation.

Thus, it would be desirable to provide a steering column stalk switch which incorporates numerous vehicle operating circuit functions into a single switch lever assembly. It would also be desirable to provide a steering column stalk switch which provides easy and smooth operation of the various movable components thereof and, at the same time, provides a positive, tactile feel for the movement of such components between various positions. It would also be desirable to provide a steering column stalk switch assembly which is easily assembled for a low manufacturing cost.

SUMMARY OF THE INVENTION

The present invention is a stalk switch apparatus mountable on a steering column of a motor vehicle for controlling various operating circuits and devices in the vehicle.

The stalk switch apparatus includes an elongated shaft having first and second opposed ends, the first end being pivotally attached to a switch housing mountable on the steering column of a vehicle. A hub is fixedly mounted on the second end of the shaft. A hollow housing with first and second ends is provided, the hub fixedly engaging the first end of the housing. A circuit board is disposed in the housing in fixed engagement with the hub. The circuit board includes a plurality of electrically conductive tracings disposed at timed intervals, with electrical conductors extending from the conductive tracings exteriorly of the shaft to various operating circuits in the vehicle, such as, for example, a vehicle cruise control device.

A first aperture is formed in the second end of the housing. A button is mounted in the housing and is accessible through the first aperture. The button is movable between first and second positions. A button biasing means is mounted in the housing and is seated between the circuit board and the button for biasing the button to the first position and for biasing the circuit board into fixed engagement with the hub. A plurality of first electrical contacts are mounted on the button and engage certain conductive tracings on the circuit board when the button is in the second position to close an electrical circuit connected to the certain conductive tracings. For example, the conductive tracings engaged by the first electrical contacts can be connected to the set speed circuit of a vehicle cruise control.

A carrier having first and second ends is slidably mounted in the housing. A radially outward extending projection is formed on the second end of the carrier and extends through a side wall aperture in the housing. A detent paw having first and second opposed ends is mounted on the carrier for movement between first and second positions with respect to the carrier. Means are mounted on the carrier in engagement with the second end of the detent paw for biasing the detent paw to the first position.

An arm is formed on the hub and extends axially therefrom. First and second spaced detents are formed on the arm. In addition, a ramp surface extends angularly from the second detent on the arm. The arm and the first end of the detent paw are axially aligned such that the first end of the detent paw is slidably movable between the first and second detents and along the angular ramp during sliding movement of the carrier. The detent paw biasing means engages the arm when the carrier is urged to a position in which the first end of the detent paw extends beyond the second detent and along the angular ramp for biasing the carrier toward the second detent. A lever is mounted about the shaft, contiguous with the exterior surface of the housing.

A plurality of second electrical contacts are mounted on the carrier. Each of the second electrical contacts, as well as the first electrical contacts, are in the form of resilient arms cantilevered from a first end attached to the carrier and the button and are movably disposed away from the carrier and the button at the second end. Further, the second ends of each of the plurality of first and second electrical contacts extend in the same direction toward the button so as to simplify the assembly of the stalk switch apparatus.

A plurality of second electrically conductive tracings are also arranged on the circuit board and are slidably engaged by the plurality of second electrical contacts. Each of the second group of second electrically conductive tracings also has a different starting point from one end of the circuit board for selective engagement with one of the plurality of second electrical contacts as the second electrical contacts are moved with the carrier between discrete carrier positions. In an exemplary embodiment, the second electrical contacts and associated second conductive tracings are respectively connected to the off, on, and resume set speed circuits of a vehicle cruise control.

The arm on the hub preferably includes a base wall, a first end connected to the hub and a second end spaced from the first end and extending axially outward from the hub. A first projection extends from the second end of the arm in a predetermined profile from the base wall. A second projection is also formed on the arm and is spaced from the first projection. The second projection has a second profile. The first detent is formed between the first and second projections. The angular ramp extends from the terminus of the second projection angularly from the base wall at a predetermined angle. The second detent is formed between the second projection and the start of the angular ramp.

The carrier preferably includes a base having a pair of spaced walls formed thereon. An inwardly extending flange is formed on one end of each wall and faces and is spaced from the flange on the opposed wall to define an aperture through the two walls. The detent paw is mounted exteriorly around the walls on the base of the carrier. The first end of the detent paw is disposed adjacent to and outside of the aperture formed between the flanges on the walls. The means for biasing the detent paw preferably comprises a coil spring which is seated between the flanges on the walls of the carrier and the second end of the detent paw. The coil spring is aligned with the second end of the arm on the hub so as to be engaged by an angular ramp formed on the second end of the arm as the carrier is moved toward the first end of the shaft and the detent paw moves from the second detent along the angular ramp on the arm. The spring is compressed by the second end of the arm and provides a compressive force to positively return the first end of the detent paw to the second detent on the arm when user force On the carrier is released. This minimizes the possibility of any sticking of the first end of the detent paw on the angular surface of the arm.

The steering column mounted stalk switch apparatus of the present invention has a unique configuration which simplifies assembly and insures a positive tactile feel to movement of the button and the carrier between various positions. The profile, ramp angle and height of the various projections on the arm forming the first and second detents and the angular inclined ramp surface as well as the spring force of the detent biasing spring may be tailored to meet the needs of a particular application insofar as providing different detent locking movements, tactile feel, etc.

Further, the steering column stalk switch apparatus uniquely orients the cantilevered first and second contacts in the same direction so as to simplify the insulation of the contacts and the circuit board carrying the conductive tracings in the housing. Furthermore, the button biasing spring serves a dual purpose as it not only biases the button to a normal first position; but, also, urges the circuit board into fixed engagement with the hub to take up any tolerance or slack in the assembly of these components of the stalk switch apparatus. The detent paw biasing means or coil spring also serves a dual purpose in that it biases the detent paw to a first position and, also, biases the carrier toward the second detent position when the carrier is moved forward thereby assuring that the carrier and the detent paw mounted thereon will positively return to the second detent from the angular inclined surface or ramp after a moving force on the carrier has been released.

BRIEF DESCRIPTION OF THE DRAWING

The various features, advantages and other uses of the present invention will become more apparent by referring to the following detailed description and drawing in which:

FIG. 1 is a front elevational view of a steering column stalk switch apparatus according to the present invention;

FIG. 2 is a longitudinal cross sectional view generally taken along line 2—2 in FIG. 1;

DESCRIPTION OF THE PREFERRED EMBODIMENTS

Figure 3:
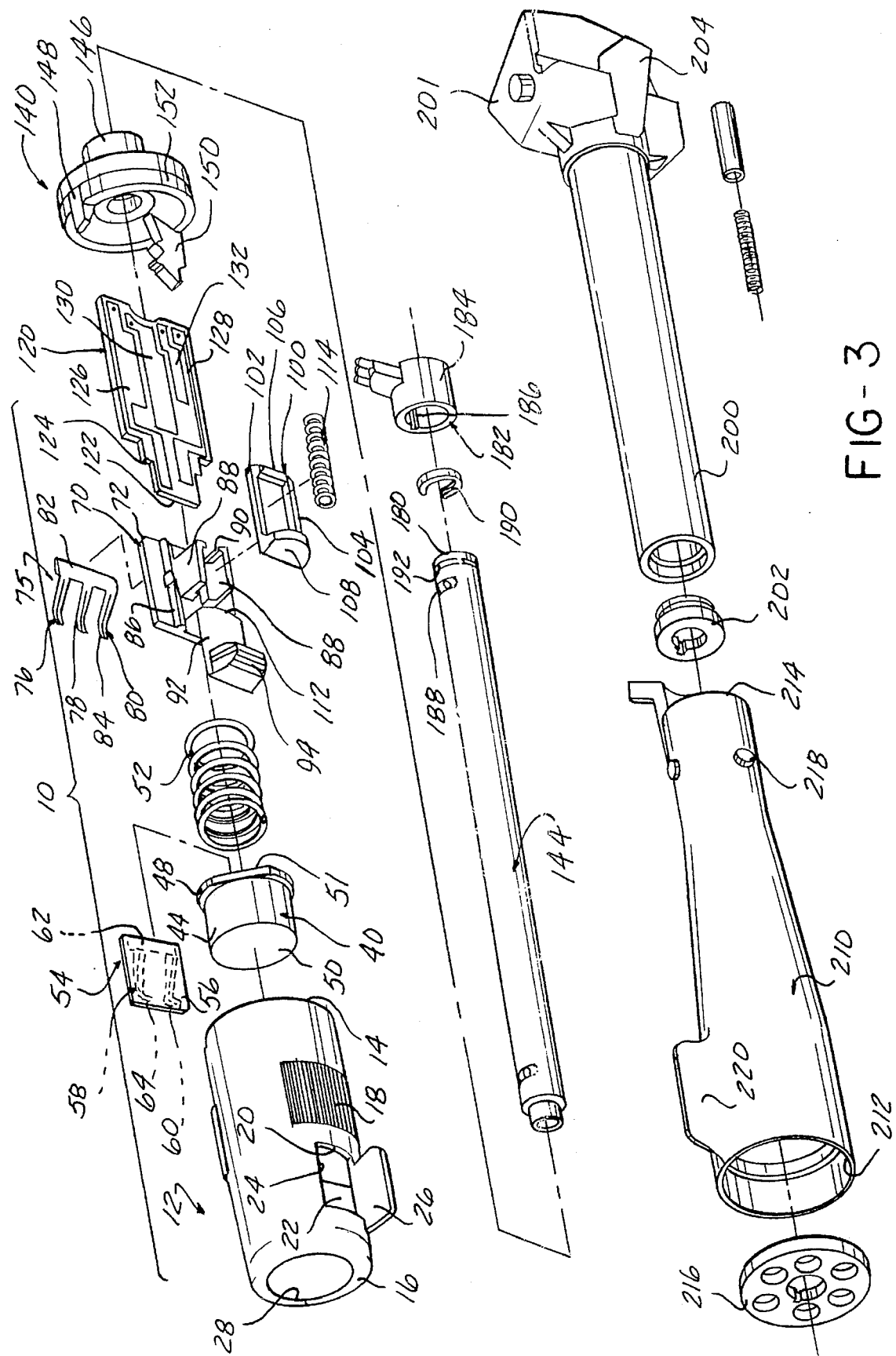
FIG. 3 is an exploded, perspective view of the steering column stalk switch apparatus shown in FIG. 1.

Referring now to the drawing, and to FIG. 1 in particular, there is illustrated a steering column mounted stalk switch apparatus 10 which is operative to control the operation of various vehicle operating circuits and devices, such as a vehicle windshield wiper and washer controls, turn signals, vehicle headlight switching between low and high beam and the on, off, set and resume set speed operations of a vehicle cruise control device.

Figure 4:
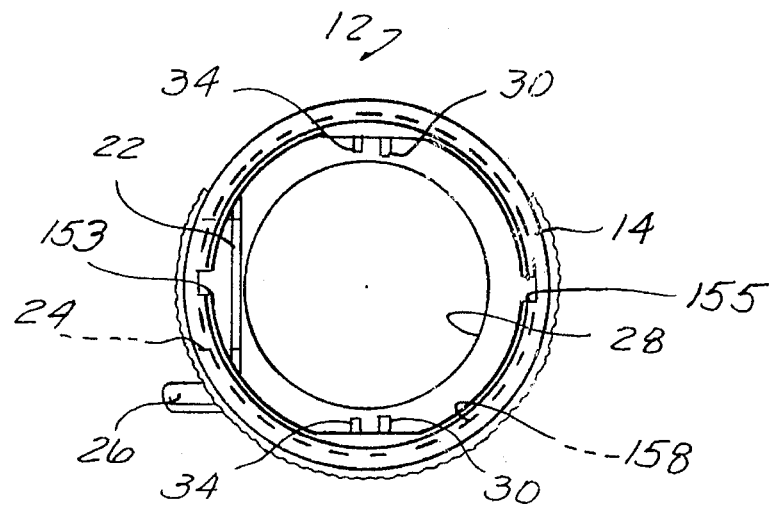
FIG. 4 is a right end elevational view of the knob housing of the steering column stalk switch apparatus shown in FIG. 1.

As shown in FIG. 1, and in greater detail in FIGS. 2-4, the steering column stalk switch apparatus 10 includes a knob or housing 12 which is, rotatably mounted on the end of the stalk switch apparatus 10. The housing 12 is hollow and is preferably formed of molded plastic. The housing has first and second opposed ends 14 and 16, respectively, and a side wall which tapers from the slightly larger diameter first end 14 to the smaller diameter second end 16. A gripping ring 18, preferably in the form of an annular arrangement of knurls, is formed exteriorly on the side wall of the housing 12 to aid in rotating the housing 12.

A slot 20 is formed in the side wall of the housing adjacent the second end 16. A wall 22 is integrally formed with the side wall of the housing 12 but is inset in the slot 20 to close off a portion of the length of the slot 20 as shown in FIGS. 2 and 3. A first aperture 24 is formed between the end of the wall 22 and one edge of the slot 20 as shown in FIG. 3. A protective tab 26 is integrally formed with the side wall of the housing 12 and extends radially outward from the housing 12 below the slot 20.

A second aperture 28 is formed in the second end 16 of the housing 12, the purpose of which will be described in greater detail hereafter. As shown in FIG. 4, a plurality of internally formed pairs of ribs are formed in the housing 12 and provide mounting seats for various components of the stalk switch apparatus 10, as described hereafter. A first pair of ribs 30 are formed in a diametrically opposed manner in the housing 12. The ribs 30 extend substantially the entire length of the housing 12 from the fist end 14 to the inner edge of an internal sleeve 32 which extends inward from the second end 16 of the housing 12 and is spaced at the inner end from the side wall of the housing 12 as shown in FIG. 2. A second pair of diametrically opposed ribs 34 are also formed in the housing 12 and are circumferentially spaced from the first pair of ribs 30. The second pair of ribs 34 extends only partially from the inner edge of the sleeve 32 toward the first end 14 of the housing 12.

Further details of the housing 12 will be described hereafter in conjunction with other components of the steering column stalk switch assembly 10.

Figure 5:
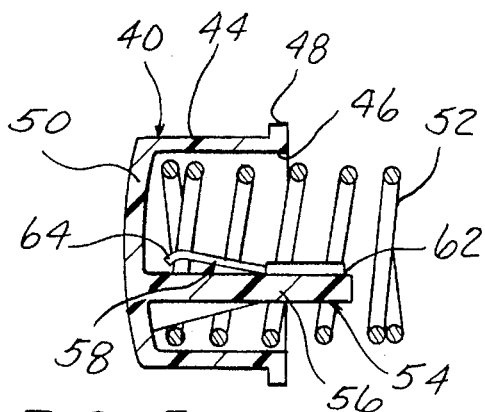
FIG. 5 is a longitudinal cross sectional view of the set button shown in FIGS. 2 and 3.

A button 40 is movably mounted in a bore 42 formed by the internal sleeve 32 in the second end 16 of the housing 12. As shown in FIG. 5, the button 40 is in the form of a hollow cap-like member having a cylindrical side wall 44, an open first end 46 bounded by a radially outwardly extending flange 48 and a solid second end wall 50. A flat 51, shown in FIG. 2, is formed in a limited angular portion of the annular flange 48 and slidably engages the inner portion of the wall 22 in the slot 20 in the housing 12 to key the position of the button 40 in a desired orientation within the housing 12.

A button biasing means, denoted generally by reference number 52, is mounted within the interior of the button 40 and extends partially outward from the first end 46 thereof. The button biasing means 52 is preferably in the form of a coil spring which seats at one end on the solid second end wall 50 44 of the button 40.

A first electrical contactor 54 is fixedly mounted within the button housing 44 by any suitable means, such as, preferably, by heat staking. The first electrical contactor 54 includes a plastic base 56. A plurality of first electrical contacts, such as two electrical contacts 58 and 60, are mounted on the base 56. The contacts 58 and 60 are integrally connected at a first end 62 and each extends to a second end 64 in a direction toward the solid second end wall 50 of the button housing 44 in a resilient, cantilevered fashion. The contacts 58 and 60 are formed of any suitable electrically conductive material, such as copper. As shown in FIG. 5, the second ends 64 of each of the contacts 58 and 60 are spaced from the base 56 of the first electrical contactor 54.

As shown in FIGS. 2, 3, 6 and 7, a carrier 70 is slidably mounted within the knob housing 12. The carrier 70 includes a generally rectangular or square base 72 formed of an insulating material, such as plastic. A pair of spaced clips 74 are formed on one surface of the base 72 of the carrier 70 and include a portion spaced from one surface of the base 72. The clips 74 are spaced apart on the base 72 and snapingly receive a second electrical contactor 75 therein.

Figure 7:
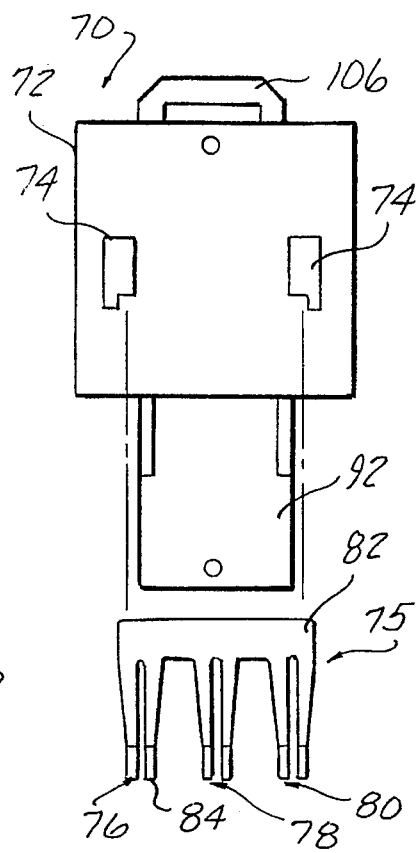
FIG. 7 is an exploded, front elevational view showing the mounting of the second electrical contactor on the carrier.

As shown in FIGS. 2, 3 and 7, the second electrical contactor 75 includes a plurality of resiliently movable contacts, such as contacts 76, 78 and 80. Each of the contacts 76, 78 and 80 are integrally joined together at a first end 82. The first end 82 is mounted in the clips 74 in a snap-together fit to securely attach the second electrical contactor 75 to the base 72 of the carrier 70. The second ends 84 of each of the contacts 76, 78 and 80 extends from the common first end 82 upwardly and outwardly away from the clip 74 when the second contactor 75 is mounted on the base 72 of the carrier 70. It should be noted that the second ends 84 of each of the contacts 76, 78 and 80 of the second electrical contactor 75 extend toward the solid second end wall 50 of the button 40 in the same manner as the contacts 58 and 60 of the first electrical contactor 54.

Figure 6:
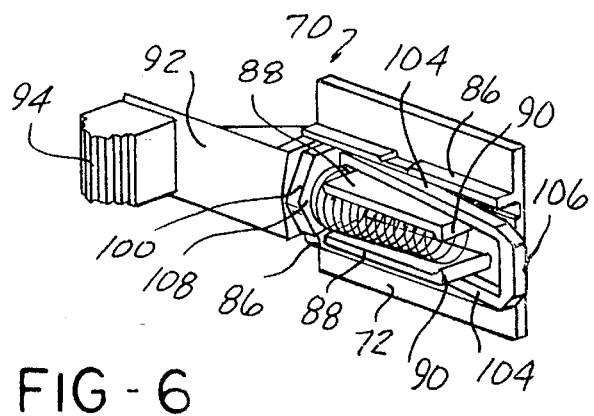
FIG. 6 is a perspective view showing the assembled carrier, detent paw and detent biasing spring.

An outer pair of side walls 86 are formed on the opposite surface of the base 72 of the carrier 70 as shown in FIGS. 3 and 6. The outer pair of side walls 86 have a relatively short height. An inner pair of side walls 88 are formed between the outer pair of side walls 86 and have a greater height so as to extend above the outer pair of side walls 86. The inner pair of side walls 88 are spaced apart and have an inwardly facing flange 90 formed at one end. The flanges 90 face each other and are spaced apart to define an aperture therethrough.

An L-shaped leg 92 is integrally formed with and extends above and longitudinally outward from one end of the base 72 of the carrier 70. An arcuate projection 94 is formed at one end of the leg 92. The leg 92 is configured to be slidably disposed in the slot 20 in the knob housing 12 in engagement with the outer surface of the wall 22 formed in the slot 20. In this mounting orientation, the projection 94 extends exteriorly of the slot 20 above the protective tab 26. The projection 94 forms a suitable surface for user engagement to slidably move the carrier 70 between a number of positions, as described hereafter.

A detent paw 100 is mounted on the carrier 70. The detent paw 100 has a generally rectangular shape formed of opposed side walls 102 and 104 which are mountable between the inner and outer pair of walls 86 and 88 on the carrier 70. The detent paw 100 also includes a first end 106 and a raised, opposed second end 108. A projection 110, shown in FIG. 2, is formed on the raised second end 108 of the detent paw 100 and faces the first end 106.

The raised second end 108 is mounted between the ends of the inner walls 88 of the carrier 70 and a shoulder 112 formed a portion of the leg 92 extending upward from the base 72 of the carrier 70.

Detent biasing means 114, preferably in the form of a coil spring, is mounted under a preload force on the carrier 70. The detent biasing means or spring 114 seats over the projection 110 on the raised second end 108 of the detent paw 100 and the inwardly extending flanges 90 on the inner walls 88 of the carrier 70. In this position, as shown in FIG. 6, the spring 114 exerts a force against the second end 108 of the detent paw 100 to pivot the first end 106 of the detent paw 100 away from the base 72 of the carrier 70. However, the first end 106 of the detent paw 100 is capable of movement toward the base 72 of the carrier 70 during sliding movement of the carrier 70 as described hereafter.

In assembling the components described thus far, the first electrical contactor 54 is fixedly mounted in the button 40 by heat staking or other suitable means with the raised second ends 64 of the contacts 58 and 60 of the first electrical contactor 54 extending toward the second end or solid end wall 50 of the button 40. The button 40 is then slidably mounted in the knob housing 12 with the flat 51 on the button 40 aligned with the inner surface of the wall 22 in the slot 20 in the housing 12 to properly align the button 40 in the housing 12. In this position, the solid end wall 50 is accessible exteriorly through the second aperture 28 in the second end 16 of the housing 12, as shown in FIG. 2.

The detent paw 100 is mounted on the carrier 70 such that the side walls 102 and 104 are disposed between the pairs of inner and outer walls 86 and 88 on the carrier 70. The biasing spring 114 is then inserted between the flanges 90 of the inner walls 88 and the raised second end 108 of the detent paw 100. The spring 114 is thus under a compressive force and biases the first end 106 of the detent paw 100 away from the base 72 of the carrier 70.

Next, the carrier 70 is slidably inserted into the housing 12 such that the surface of the base 72 on which the clips 74 are mounted slidably engages one side of the diametrically opposed ribs 34. The clips 74 are thus disposed between the ribs 34. The carrier 70 is inserted into the housing 12 to bring the projection 94 outward through the slot 20 with the leg 92 slidably engaging the inner wall 22, as shown in FIG. 2. In this position, the carrier 70 is capable of sliding movement to the right, in the orientation shown in FIG. 2 and 3, with the leg 92 completely covering the aperture 24 in the housing 12. Likewise, the inner wall 22 in the housing 12 cooperates with the leg 92 of the carrier 70 to close off the aperture 24 at all times to prevent the entry of foreign matter into the interior of the housing 12.

Figure 8:
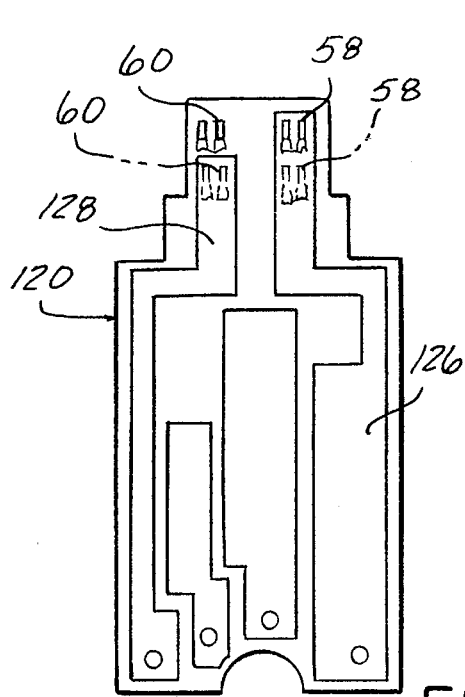
FIG. 8 is a plan view showing the discrete positions of the first electrical contactor on the circuit board.
Figure 9:
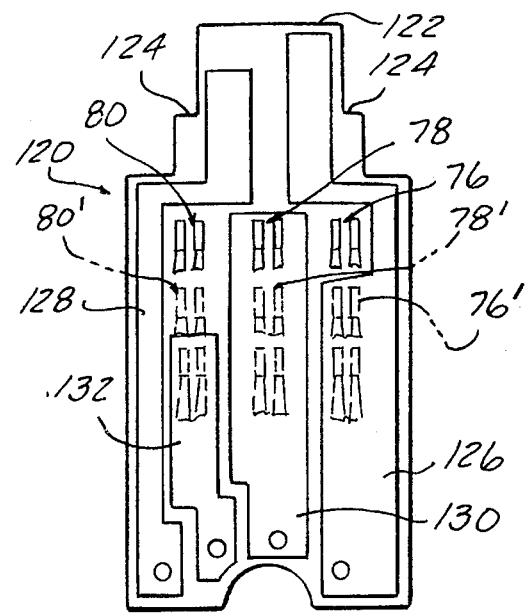
FIG. 9 is a diagrammatic view showing the position of the contacts of the second electrical contact or on the circuit board.

As shown in FIGS. 2 and 3, and in greater detail in FIGS. 8 and 9, the stalk switch assembly 10 also includes a circuit board 120 which is slidably inserted into the housing 12. The circuit board 120 is of conventional construction and is formed of a suitable electrically insulating material. A plurality of electrically conductive traces are formed on one surface of the circuit board 120 and are individually connected to electrical conductors 122, shown in FIG. 1, which are in turn connected to various operating circuits of a cruise control device.

The circuit board 120 is mounted in the housing 12 between the diametrically opposed pairs of ribs 30 and 34. In this orientation, the exposed surface of the conductive traces face the contacts of the first and second electrical contactors 54 and 75 so as to be wiped by the contacts of the contactors 54 and 75 during movement of the button 40 and the carrier 70 as described hereafter. The first end 122 of the circuit board 120, which is inserted toward the second end wall 50 of the button 40, is formed with a necked down region which forms opposed shoulders 124. The shoulders 124 form a seat for the button biasing spring 52. As the circuit board 120 is held in a fixed position within the steering column stalk switch apparatus 10, as described hereafter, the biasing spring 52 normally biases the button 40 to a first position toward the second end 16 of the knob housing 12 as shown in FIG. 2. However, user exerted force on the solid end wall 50 of the button 40 is capable of overcoming the force of the biasing spring 52 and move the button 40 to a second position in which the contacts of the first electrical contactor 54 mounted thereon engage certain conductive tracings on the circuit board 120.

As shown in FIG. 8, in the normal first or off position shown in FIG. 2, the contacts 58 and 60 of the first electrical contactor 54 mounted in the button 40 engage portions of the circuit board 120. In this first position, the first contact 58 engages a first conductive trace 126 on the circuit board 120. The second electrical contacts 60 engages an insulating portion of the circuit board 120 such that no electrical power can flow between the contacts 58 and 60. However, movement of the button 40 to the second position brings the first and second contacts 58 and 60 of the first electrical contactor 54 carried thereon to a second, position shown in phantom in FIG. 8. In this position, the first contact 58 remains in engagement with the conductive trace 126. The second contact 60, in this second position, engages a second conductive trace 128 thereby forming a circuit between the contacts 58 and 60 to supply electrical power to the set speed circuit of the vehicle cruise control device. Release of the button 40 will enable the biasing spring 52 to return the button 40 to the normal, first position shown in FIG. 2 in which the electrical circuit between the contacts 58 and 60 opens.

It should be noted that the conductive tracings 126 and 128 are disposed in a predetermined length, start point from the first end 122 and timed relationship with respect to the position of the button 40 so as to engage the contacts 58 and 60 in each distinct first and second position of the button 40 as described above.

FIG. 9 depicts the operation of the contacts 76, 78 and 80 of the second electrical contactor 75 mounted on the carrier 70 in various operative states depending upon the position of the carrier 70. In a first position of the carrier 70, as depicted in FIG. 2, the electrical contacts 76, 78 and 80 will be oriented as shown in FIG. 9. The first electrical contact 76 engages an insulating portion of the circuit board 120. The second electrical contact 78 is disposed in engagement with a conductive trace 130 on the circuit board 120. The third electrical contact 80 is also disposed in engagement with an insulating portion of the circuit board 120. This position of the contacts 76, 78 and 80 and the carrier 70 is defined in the exemplary embodiment as an "off" position of the vehicle cruise control device.

Movement of the carrier 70 from the first position shown in FIG. 2 to a second position, as described hereafter, brings the contacts 76, 78 and 80 to the position shown in phantom in FIG. 9 and depicted by reference numerals 76', 78' and 80'. In this position, the first and second electrical contacts 76 and 78 engage the conductive traces 126 and 130, respectively, on the circuit board 120 to form a closed circuit therebetween. The third electrical contact 80' remains in engagement with an insulating portion of the circuit board 120. This position is defined, in the exemplary embodiment, as the "on" position of the vehicle cruise control.

Further movement of the carrier 70 to the right in the orientation shown in FIG. 2 brings the contacts 76, 78 and 80 to a third position shown in phantom in FIG. 9. In this position, each of the contacts 76, 78 and 80 is respectively disposed in contact with the conductive traces 126, 130 and 132 on the circuit board 120. This position is defined, in the exemplary embodiment, as the "resume set speed" position of the vehicle cruise control. The carrier 70 is capable of movement in an opposite direction to the second or first positions at the user's preference.

A hub 140 is mounted on one end 142 of a shaft 144. The hub 140, which is preferably formed of molded plastic, has a cylindrical first end 146 with an internal bore and a key slot which is mountable over the first end 142 of the shaft 144. After the hub 140 is mounted on the first end 142 of the shaft 144, the outer end portion of the first end 142 of the shaft 144 is flared outward to secure the hub 140 in a fixed position on the shaft 144.

It should be noted that FIG. 3 depicts the hub 140 and the shaft 144 90° out of their normal mounting position for reasons of clarity. The hub 140 also includes a pair of spaced longitudinally extending arms 148 and 150 which extend longitudinally from a raised annular end flange 152 on a second end of the hub 140. The arms 148 and 150 are devised to slidably engage key slots 153 and 155, respectively, extending inward from the first end 14 of the knob housing 12, as shown in FIG. 4. This orients the hub 140 in a predetermined position with respect to the housing 12. As further shown in FIG. 2, the first end 14 of the knob housing 12 has a slight, radially inward taper extending from the first end 14. An enlarged annular recess is formed adjacent the taper and receives the raised annular flange 152 on the hub 140 in a snap-together fit to permanently secure the hub 140 to the knob housing 12.

Figure 10:
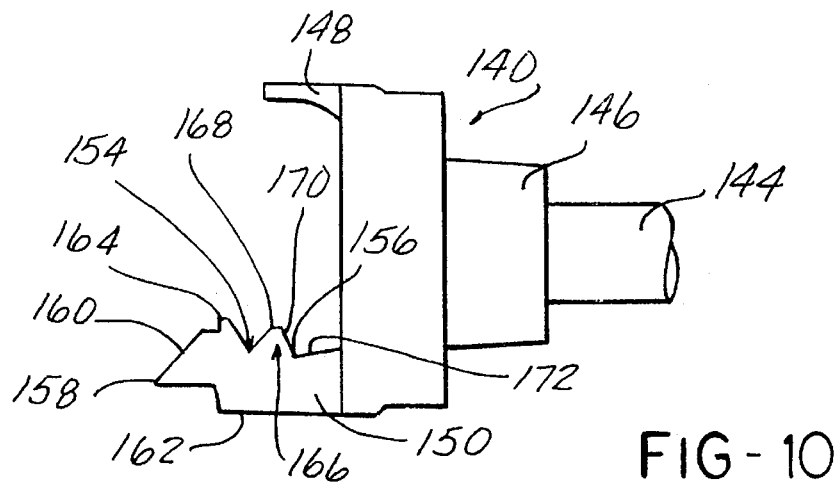
FIG. 10 is an enlarged side elevational view of the detents on the hub.
Figure 11:
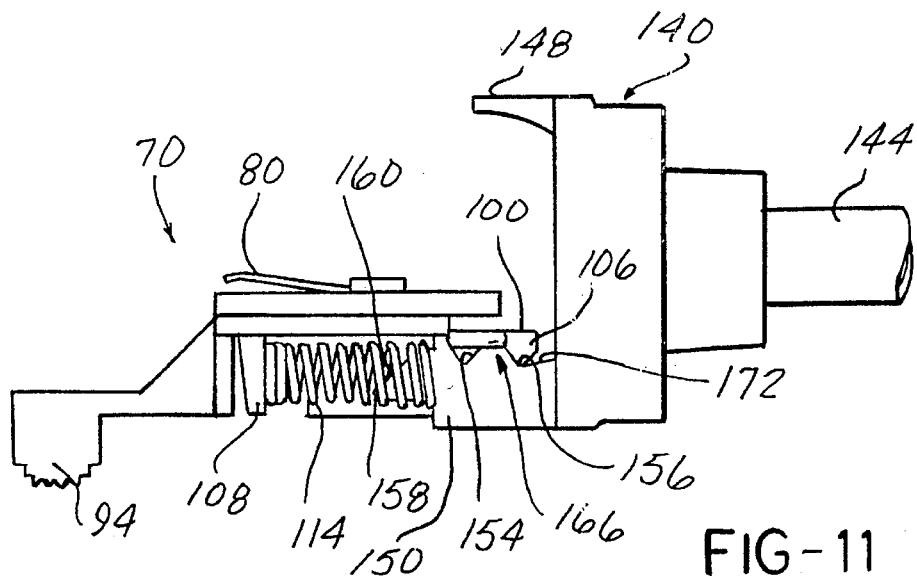
FIG. 11 is an enlarged side elevational view showing the detent paw on the resume set speed ramp.

The second arm 150 is formed with first and second detents 154 and 156, respectively, as more clearly shown in FIG. 10 and 11. Specifically, the arm 150 has an outer end 158 from which an inclined ramp 160 extends at an acute angle from an outer peripheral portion or base 162 of the arm 150. A raised projection 164 is formed at the top end of the ramp 160. A recess or first detent 154 is formed at the innermost termination of an angular surface extending from the projection 164 toward the base 162 of the arm 150. This recess or first detent position 154 defines the "off" position of the vehicle cruise control when the first end 106 of the detent paw 100 is disposed therein, as shown in FIGS. 2 and 11. A second projection 166 is also formed in the arm 150. The second projection 166 is spaced from the first projection 164 and is formed with opposed angularly inclined ramp surfaces 168 and 170, respectively. The second ramp surface 170 terminates in a second detent position 156 as shown in FIG. 10. When the first end 106 of the detent paw 100 is disposed in the second detent position 156, the vehicle cruise control is energized or in the "on" position through the second contacts 76 and 78. In this position, inward movement of the button 40 will set a predetermined vehicle speed for the cruise control device. A further inclined ramp surface 172 extends angularly upward from the second detent position or recess 156 away from the base 162. This ramp surface 172 defines a momentary "resume set speed" position for the vehicle cruise control.

To complete the assembly of the stalk switch apparatus 10, after the circuit board 120 has been slidably inserted into the knob housing 12, as described above, the hub 140, having previously been fixedly mounted on the first end 142 of the shaft 144, will be urged into a snap fit with the first end 14 of the knob housing 12, as also described above. This brings the second end of the hub 140 into fixed engagement with one end of the circuit board 120 so as to fixedly orient the circuit board 120 in a non-movable position with respect to the housing 12. During the sliding insertion of the hub 140 into the knob housing 12, the first end 106 of the detent paw 100 will slidably engage the ramp 160 and will pivot from its normal position toward the base 72 of the carrier 70 sufficient to clear the projection 164 and seat in the first detent position 154 in the arm 150 on the hub 140.

In use, movement of the carrier 70 to the right, in the orientation shown in FIG. 2, will cause the first end 106 of the detent paw 100 to move over the projection 166 into the second detent position 156 with a positive stop. Further movement of the carrier 70 to the right will cause the detent paw 100 to move along the ramp surface 172 to bring the contacts 76, 78 and 80 to the third position shown in phantom in FIG. 9 which activates the resume set speed circuit of the vehicle cruise control.

As shown in FIG. 11, during such movement of the first end 106 of the detent paw 100 along the ramp 172, the first end and end ramp 160 of the arm 150 on the hub 140 slides within the detent biasing spring 114 contained within the inner side walls 88 on the carrier 70 and further compresses the coil spring 114. In this manner, release of the projection 94 on the carrier 70 will enable the coil spring 114 to urge the carrier 70 to the left in the orientation shown in FIG. 11 away from the first end 158 of the arm 150 on the hub 140 to bring the first end 106 of the detent paw 100 back to the second detent position 156. This retains the cruise control in the "on" position. At any time, the user may exert a leftward movement on the projection 94 of the carrier 70 to bring the first end 106 of the detent paw 100 over the projection 166 and back to the first detent position 154, shown in FIG. 2, to deactivate or turn off the vehicle cruise control.

The profiles, ramp angles and heights of the first and second projections 164 and 166, the spring force of the detent spring 114 and the pivot point of the detent paw 100 may be tailored to provide any desired sliding movement and tactile feel for the operation of the carrier 70. Further, these characteristics are chosen so that a positive return of the detent paw 100 from the ramp 172 to the second detent position 156 is insured.

The shaft 144 preferably comprises a hollow cylinder having a second end 180 opposed from the first end 142. A gear means 182 is fixedly mounted on the second end 180 of the shaft 144. The gear means 182 by way of example includes an annular collar 184 having an internal key slot 186 which slidably engages a key projection 188 formed on the shaft 144, adjacent the second end 180 thereof. The gear means 182 includes a plurality of radially extending, circumferentially spaced teeth which are designed to engage a driven gear, not shown, mounted in a switch housing attached to the stalk switch assembly 10. The gear means 182 drives the driven gear which, in turn, moves a contact attached thereto between engagement with various fixed contacts mounted in the switch housing to selectively control the operation of an electrical device, such as a vehicle windshield wiper assembly between off, on and a plurality of discrete, intermittent operating speeds depending upon the degree and direction of rotation of the housing 12. By way of example only, the gear means 182 comprises a non-involute gear disclosed in U.S. Pat. No. 5,259,262, issued Nov. 9, 1993, in the name of Daniel J. DuRocher, one of the present Applicants, and entitled "NON-INVOLUTE GEAR" the contents of which are incorporated herein by reference. A C-ring 190 is slidably engageable in an annular recess 192 formed on the shaft 144, adjacent the second end 180 thereof, to retain the gear means 182 on the shaft 144.

As shown in FIGS. 2 and 3, the second end 180 of the shaft 144 is pivotally connected to a switch housing 201 for pivotal movement in at least one of two mutually separate planes, i.e., generally vertical and horizontal. The pivot connections used to pivotally attach the shaft 144 to the switch housing 201 and the various operators moved by such pivotal movement of the entire stalk switch apparatus 10 in two mutually exclusive planes can be had by referring to U.S. Pat. No. 5,049,706, filed in the name of Daniel J. DuRocher, one of the present Applicants, and entitled "MULTIFUNCTION STEERING COLUMN SWITCH" the contents of which are incorporated herein by reference.

As shown in FIGS. 2 and 3, a lever 200 having a generally hollow, elongated cylindrical shape is mounted concentrically about the shaft 144. A bearing 202 is mounted in one end of the lever 200, preferably by a snap fit, to rotatably mount the shaft 144 within the lever 200. The opposite end of the lever 200 has an outwardly extending flange 204 with an internal bore 206 which receives a spring-biased plunger.

Finally, to complete the steering column stalk switch apparatus 10, an outer washer paddle housing 210 having a generally cylindrical shape with a larger diameter first end 212, and a side wall which tapers to a smaller diameter, opposed second end 214, is rotatably disposed over the lever 200. The housing 210 receives a bearing 216 in the first end 212 through which the shaft 144 rotatably extends. The second end 214 of the housing 210 rotatably rests on the exterior surface of the lever 200. A plurality of radially extending, circumferentially spaced projections 218 are formed on the exterior surface of the housing 210 for mounting a rubber boot around the switch assembly thereto in a conventional manner. A paddle arm 220 is integrally formed with and extends radially outward from the first end 212 of the housing 210 to provide a convenient gripping surface for rotating the housing 210.

In summary, there has been disclosed a unique steering column mounted stalk switch apparatus which has a simplified construction over previously devised stalk switches. The present stalk switch apparatus presents a positive tactile feel and smooth movement of the various sliding members and movable button between various positions. Furthermore, the stalk switch apparatus is designed to positively prevent any sticking of the sliding member in the temporary resume set speed position of a vehicle cruise control device.

What is claimed is:

1. A steering column stalk switch apparatus comprising:

a shaft having first and second opposed end portions;

first and second co-axially arranged housing portions independently coaxially rotatable with respect to each other and co-acting to form an elongated substantially closed stalk switch housing;

means for connecting the first end portion of the shaft to the first housing portion for rotation of the shaft with rotation of the first housing portion;

first bearing means, engaged with the shaft and the second housing portion for co-axially and rotatably supporting the shaft within the second housing portion;

a lever pivotally extending from a switch housing, the lever extending at least partially through the second housing portion and receiving the shaft therethrough.

2. The steering column stalk switch apparatus of claim 1 further comprising:

second bearing means, carried with the lever, for co-axially and rotatably supporting the second end portion of the shaft within the lever.

3. The steering column stalk switch apparatus of claim 1 wherein the connecting means comprises:

means, carried with the first housing portion, for fixedly receiving the first end portion of the shaft in the housing.

4. The steering column stalk switch apparatus of claim 1 wherein:

the first bearing means further includes means, engaged between the lever and the shaft, for co-axially and rotatably supporting an intermediate portion of the shaft with respect to the lever.

5. The steering column stalk switch apparatus of claim 1 wherein the first bearing means comprises:

one bearing mountable in an end of the lever and rotatably receiving the shaft therethrough; and another bearing engaged between the second housing portion and the shaft for enabling independent rotation of the shaft and the second housing portion with respect to each other.

6. The steering column stalk switch apparatus of claim 1 wherein:

the first bearing means enables independent rotation of each of the shaft and the second housing portion with respect to each other and the lever.

7. A steering column stalk switch apparatus comprising:

a shaft having first and second opposed end portions;

first and second co-axially arranged housing portions independently coaxially rotatable with respect to each other and co-acting to form an elongated substantially closed stalk switch housing;

means for connecting the first end portion of the shaft to the first housing portion for rotation of the shaft with rotation of the first housing portion;

a lever pivotally extending from a switch housing, the lever extending at least partially through the second housing portion and receiving the shaft therethrough; and means for forming a first bearing surface between the lever and the shaft for rotation of the shaft relative to the lever, and for forming a second bearing surface between the shaft and the second housing for rotation of the shaft and the second housing relative to each other.

8. The steering column stalk switch apparatus of claim 7 wherein:

the shaft and the second housing portion are independently rotatable with respect to each other about the lever.

* * * * *